UNITED STATES PATENT OFFICE.

CONRAD SCHRAUBE, OF LUDWIGSHAFEN-ON-THE-RHINE, BAVARIA, ASSIGNOR TO THE BADISCHE ANILIN AND SODA FABRIK, OF MANNHEIM, GERMANY.

PRODUCTION OF ACETINE-BLUE COLORS.

SPECIFICATION forming part of Letters Patent No. 352,361, dated November 9, 1886.

Application filed September 9, 1886. Serial No. 213,182. (No specimens.) Patented in Germany February 26, 1886, No. 37,064; in France March 24, 1886, No. 174,993, and in England May 17, 1886, No. 6,631.

*To all whom it may concern:*

Be it known that I, CONRAD SCHRAUBE, a subject of the King of Prussia, residing at Ludwigshafen-on-the-Rhine, in the Kingdom of Bavaria, Empire of Germany, have invented new and useful Improvements in the Production of Acetine-Blue, (for which I have obtained patents in Germany, No. 37,064, February 26, 1886; France, No. 174,993, March 24, 1886, and in Great Britain, No. 6,631, May 17, 1886,) of which the following is a specification.

The object of this invention is to obtain brighter and more perfectly-fixed shades of induline upon the vegetable fibers than those which have been produced by the methods of printing at present practiced.

My invention consists in acetine-blue—a new coloring preparation from induline, which is obtained by mixing induline with or dissolving the same in acetine.

In carrying out my invention I take ten kilograms of induline and add thereto forty kilograms of acetine, and then I expose the mixture to a temperature of 80° to 90° centigrade for about one hour, or until a clear dark-blue solution is produced, which, after being strained or filtered, is ready for use.

The acetine which I use is obtained by heating together a quantity of glycerine with double its weight of glacial acetic acid for about forty-eight hours, and finally distilling off the excess of uncombined acetic acid. By this process a mixture of mono and di acetine is obtained which contains a small quantity of triacetine, and which serves my purpose.

The acetine-blue prepared in the manner above described can be used with great advantage for printing upon textile fabrics, and I am enabled thus to produce clear and perfectly-fixed colors without endangering the texture of the vegetable fiber.

The process of printing with my acetine-blue is carried out, in the manner usually practiced, by mixing with the acetine-blue a sufficient quantity of starch thickening and tannin. This purpose can be effected by taking twelve kilograms of acetine-blue and mixing it with eighty-five kilograms of starch thickening and three kilograms of tannin; or I can take ten kilograms of induline paste containing twenty-five per cent. dry induline, add thereto seventy-seven kilograms of starch thickening and three kilograms of tannin, and after these ingredients have been intimately mixed I add thereto ten kilograms of acetine.

What I claim as new, and desire to secure by Letters Patent, is—

As a new compound, the blue coloring-matter (acetine-blue) obtained by the action of acetine upon induline, substantially as described.

In testimony whereof I have hereunto set my hand and seal in the presence of two subscribing witnesses.

C. SCHRAUBE. [L. S.]

Witnesses:
 HY. SCHAEPPI,
 J. F. MONAGHAN.